(12) United States Patent
Kang et al.

(10) Patent No.: US 8,989,340 B2
(45) Date of Patent: Mar. 24, 2015

(54) URANIUM DIOXIDE NUCLEAR FUEL CONTAINING MN AND AL AS ADDITIVES AND METHOD OF FABRICATING THE SAME

(75) Inventors: Ki Won Kang, Daejeon (KR); Jae Ho Yang, Daejeon (KR); Keon Sik Kim, Daejeon (KR); Young Woo Rhee, Daejeon (KR); Jong Hun Kim, Daejeon (KR); Kun Woo Song, Daejeon (KR)

(73) Assignees: Korea Atomic Energy Reseach Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 1073 days.

(21) Appl. No.: 12/544,497

(22) Filed: Aug. 20, 2009

(65) Prior Publication Data

US 2013/0240805 A1 Sep. 19, 2013

(30) Foreign Application Priority Data

Nov. 11, 2008 (KR) .................. 10-2008-0111899

(51) Int. Cl.
| | | |
|---|---|---|
| G21C 3/00 | (2006.01) | |
| G21C 3/04 | (2006.01) | |
| G21C 3/62 | (2006.01) | |
| G21C 3/18 | (2006.01) | |
| G21C 3/17 | (2006.01) | |
| G21C 3/58 | (2006.01) | |
| G21C 21/00 | (2006.01) | |

(52) U.S. Cl.
CPC .. *G21C 3/04* (2013.01); *G21C 3/18* (2013.01); *G21C 3/17* (2013.01); *G21C 3/58* (2013.01); *Y02E 30/40* (2013.01); *Y02E 30/38* (2013.01); *G21C 3/623* (2013.01); *G21C 21/00* (2013.01)
USPC .......................................... 376/418

(58) Field of Classification Search
CPC ............ Y02E 30/40; G21C 3/17; G21C 3/18; G21C 3/58; G21C 3/04; G21C 3/623; G21C 21/00
USPC .......................................... 376/418
See application file for complete search history.

(56) References Cited

U.S. PATENT DOCUMENTS

| | | | | |
|---|---|---|---|---|
| 3,942,293 | A * | 3/1976 | Cook ............................. | 52/232 |
| 4,073,647 | A * | 2/1978 | Morgan ......................... | 75/235 |
| 4,200,492 | A * | 4/1980 | Armijo et al. ................. | 376/417 |
| 4,329,248 | A * | 5/1982 | Ringwood ..................... | 588/15 |
| 4,338,215 | A * | 7/1982 | Shaffer et al. ................. | 588/15 |
| 4,389,355 | A * | 6/1983 | Thornton et al. ............. | 264/0.5 |

(Continued)

FOREIGN PATENT DOCUMENTS

| | | | |
|---|---|---|---|
| JP | 07043487 | A * | 2/1995 |
| JP | 2603382 | B2 | 1/1997 |
| JP | 2002181975 | A | 6/2002 |
| KR | 100446587 | B1 | 8/2004 |
| KR | 100521638 | B1 | 10/2005 |
| KR | 100558323 | B1 | 2/2006 |
| KR | 100832567 | B1 | 5/2008 |

OTHER PUBLICATIONS

Buldini et al., "Determination of the Stoicheiometry of Uranium Dioxide by Differential-pulse Polarography", Analyst, Mar. 1984, vol. 109, pp. 225-227.*

(Continued)

*Primary Examiner* — Frank J McGue
(74) *Attorney, Agent, or Firm* — The Webb Law Firm

(57) ABSTRACT

UO$_2$ nuclear fuel pellets are fabricated by adding additive powder comprising Mn compound and Al compound into UO$_2$ powder.

4 Claims, 4 Drawing Sheets

(56) References Cited

U.S. PATENT DOCUMENTS

| | | | |
|---|---|---|---|
| 4,610,842 A * | 9/1986 | Vannesjo | 376/416 |
| 4,869,866 A | 9/1989 | Lay et al. | |
| 4,960,654 A * | 10/1990 | Yoshinaka et al. | 428/614 |
| 5,257,298 A | 10/1993 | Yuda et al. | |
| 5,421,855 A * | 6/1995 | Hayden et al. | 75/393 |
| 5,942,566 A * | 8/1999 | Lombardi et al. | 524/318 |
| 7,485,246 B2 | 2/2009 | Rhee et al. | |

OTHER PUBLICATIONS

Web page, "Other Uranium Alloys", http://web.ead.anl.gov/uranium/guide/ucompound/propertiesu/table1.cfm, Dec. 30, 2007 version.*

Petzow et al., "Die Konstitution Uranreicher Uran-Aluminum-Mangan-Legierungen", Journal of the Less-Common Metals, Mar. 8, 1967.*

Jung, In-Ho et al, "Thermodynamic Evaluation and Optimization of the MnO-Al2O3 and MnO-Al2O3-SiO2 Systems and Applications to Inclusion Engineering", Metallurgical and Materials Transactions, Apr. 2004, pp. 259-268, vol. 35B.

Yang, Jae Ho et al., "Thermo-mechanical properties of Mn-base binary elements doped UO2 fuel pellets", 2008 Water Reactor Fuel Performance Meeting, Seoul, Korea, Oct. 19-23, 2008, 4 pages, Paper No. 8081.

Kang, Ki Won et al, "MnO-Al2O3 Doped Large Grain UO2 Fuel", 16th Pacific Basin Nuclear Conference (16PBNC) Aomori, Japan, Oct. 13-18, 2008, pp. 1-5, Paper ID P16P1198.

* cited by examiner

URANIUM DIOXIDE NUCLEAR FUEL CONTAINING MN AND AL AS ADDITIVES AND METHOD OF FABRICATING THE SAME

CROSS-REFERENCE TO RELATED APPLICATIONS

This application claims the priority of Korean Patent Application No. 2008-111899 filed on Nov. 11, 2008, in the Korean Intellectual Property Office, the disclosure of which is incorporated herein by reference.

BACKGROUND OF THE INVENTION

1. Field of the Invention

The present invention relates to nuclear fuel pellets and a fabrication method thereof, and more particularly, to nuclear fuel pellets having large grains containing additives and fast creep deformation, and a fabrication method thereof.

2. Description of the Related Art

Nuclear fuel, one of the most significant elements used in nuclear reactors, generates energy by maintaining a nuclear fission chain reaction. Nuclear fuel must be fabricated such that, while it is in use, its mechanical soundness with a cladding tube covering (or surrounding) it is maintained and a nuclear fission product or the like is not leaked out, as is possible. A $UO_2$ sintered pellet used as nuclear fuel is charged in a cladding tube (e.g., a zirconium alloy cladding tube) so as to be used in a hermetically sealed state. The $UO_2$ sintered pellet is fabricated by forming a green pellet generally by using $UO_2$ powder as raw material powder and then sintering the green pellet at 1,600° C. to 1,800° C. for two to eight hours in a hydrogen gas atmosphere. The $UO_2$ sintered pellet fabricated thusly has a density of about 95% TD and a grain size ranging from about 6 μm to 10 μm.

Recently, in order to enhance the economical efficiency of nuclear fuel and to reduce the amount of spent fuel, it is necessary to extend the fuel discharged burn-up. Research on fuel pellets focuses on the high burnup fuel pellets. However, in this case, the high burnup leads to an increase in the amount of fission gases such as xenon (Xe), krypton (Kr). The fission gases in the pellet are continuously released out from the pellets during the reactor operation and increase the internal pressure of nuclear fuel rod. The increased internal pressure induced by the nuclear fission gases increase the stress working on the cladding tube, resultantly reduces the safety margin of the nuclear fuel rod. Thus, in order to solve such a problem, the nuclear fission gases generated due to nuclear fission must be released out as small amounts as possible to the outside of the sintered pellet (i.e., the pellet).

The process of nuclear fission gas release to the outside of the nuclear fuel pellet is generally known as follows. The nuclear fission gas is generated in a grain, moves to the grain boundary through diffusion so as to exist as bubbles in the grain boundary, and when the bubbles are increased to reach a certain amount, a bubble tunnel is formed along the grain boundary, and the bubbles are then discharged to the outside of the nuclear fuel pellet. Accordingly, if the grain size of the pellet is increased, the distance for the nuclear fission gas to reach the grain boundary is increased, allowing it to stay in the sintered pellet for a longer period of time, and as a result, fission gas release from the pellet can be reduced. Accordingly, a nuclear fuel pellet designed for a high burnup fuel requires for an increase in its grain size. In order to increase the grain size of the sintered pellet in the process of fabricating a nuclear fuel pellet, various additive elements such as Al, Cr, Ti, Nb, and the like, as widely known, may be used. The content of the additives to uranium cations is about a few parts per million (ppm) to thousands of ppm in weight, and the amount of additives added differs depending on their types.

The $UO_2$ nuclear fuel pellet is charged in a zirconium alloy cladding tube and burned up in a nuclear reactor. During irradiation, the nuclear fuel cladding tube is deformed inwardly while the sintered pellet expands outwardly due to a swelling phenomenon as a result of neutron irradiation, so the sintered pellet and the cladding tube are brought into contact to generate stress. This interaction between the nuclear fuel and the cladding tube is called a pellet-clad interaction, and continuation of the interaction can end in possible damage to the cladding tube. If the cladding tube is failed during reactor operation, radioactive material would flow out of the cladding tube, reducing the safety margins of the nuclear reactor.

There is a high possibility that a nuclear fuel is used in an extreme situation such as in a reactor power up-rate or frequent transition operation or the like. In particular, in the case of a highly irradiated nuclear fuel, when the reactor power increases for a short time period, the temperature of the nuclear fuel pellet rises to press the cladding tube due to thermal expansion, and when a great deal of stress is applied to the highly irradiated cladding tube for a short time period, the cladding tube would be possibly failed. Thus, in order to effectively reduce the pressure applied to the cladding tube due to the thermal expansion of the nuclear fuel pellet resulting from the reactor powder change, an improvement of the pellet softness is required by developing a pellet with a large amount of initial deformation and a large creep deformation rate (i.e., speed).

SUMMARY OF THE INVENTION

An aspect of the present invention provides nuclear fuel pellets having large grain size and a fast creep deformation rate compared to the related art $UO_2$ sintered pellets.

Another aspect of the present invention provides a method of fabricating nuclear fuel pellets capable of increasing a grain size of a nuclear fuel pellet as well as increasing a creep deformation rate of the nuclear fuel pellets.

According to an aspect of the present invention, there are provided nuclear fuel pellets comprising UO2, Mn as an additive, and Al as an additive.

Mn/Al ratio of the additives in the nuclear fuel pellets may be 1 to 100 by weight. (Mn+Al)/U ratio of the additives to $UO_2$ in the nuclear fuel pellets may be 50 50 μg/g to 3000 μg/g.

According to another aspect of the present invention, there is provided a method for fabricating nuclear fuel pellets, including: preparing mixture powder by mixing additive powder comprising Mn compound and Al compound with $UO_2$ powder; compacting the mixture powder to produce green pellets; and sintering the green pellets at 1,600° C. to 1,800° C. under a reducing gas atmosphere.

When the mixture powder is prepared, the additive powder may be mixed with $UO_2$ powder in such a way that (Mn+Al)/U ratio in the mixture powder is 50 μg/g to 3,000 μg/g, and Mn/Al ratio of the additive powder is 1 to 100 by weight.

The Mn and Al compounds contained in the additive powder may be selected from the group consisting of oxide, nitride, stearate, chloride, and hydroxide. In particular, the Mn and Al compounds may be MnO and $Al_2O_3$, respectively.

In sintering the green pellets, the reducing gas atmosphere may be a hydrogen-containing gas atmosphere. In particular, the hydrogen-containing gas may be a hydrogen-containing mixture gas which contains hydrogen gas and at least one selected from the group consisting of carbon dioxide, water vapor and inert gas. Alternatively, the hydrogen-containing gas may be hydrogen gas.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art.

Nuclear fuel pellets according to an embodiment of the present invention contains $UO_2$ as a main component, and Mn and Al as additives. Mn and/or Al additives can dissolve into the $UO_2$ grain and form oxide solid solutions with $UO_2$. Mn and/or Al additives can be in the form of oxide precipitates. Mn and Al additives can form glassy oxide phases and be precipitated along the grain boundaries of UO2 pellets. Preferably, Mn/Al ratio of the additives in the nuclear fuel pellets may be 1 to 100 by weight. Preferably, (M+Al)/U ratio of the additives to $UO_2$ may be 50 to 3000 µg/g. Mn and Al can be incorporated in the nuclear fuel pellets, for example, by adding MnO and $Al_2O_3$ powder to UO2 powder before sintering process.

Figure 1:
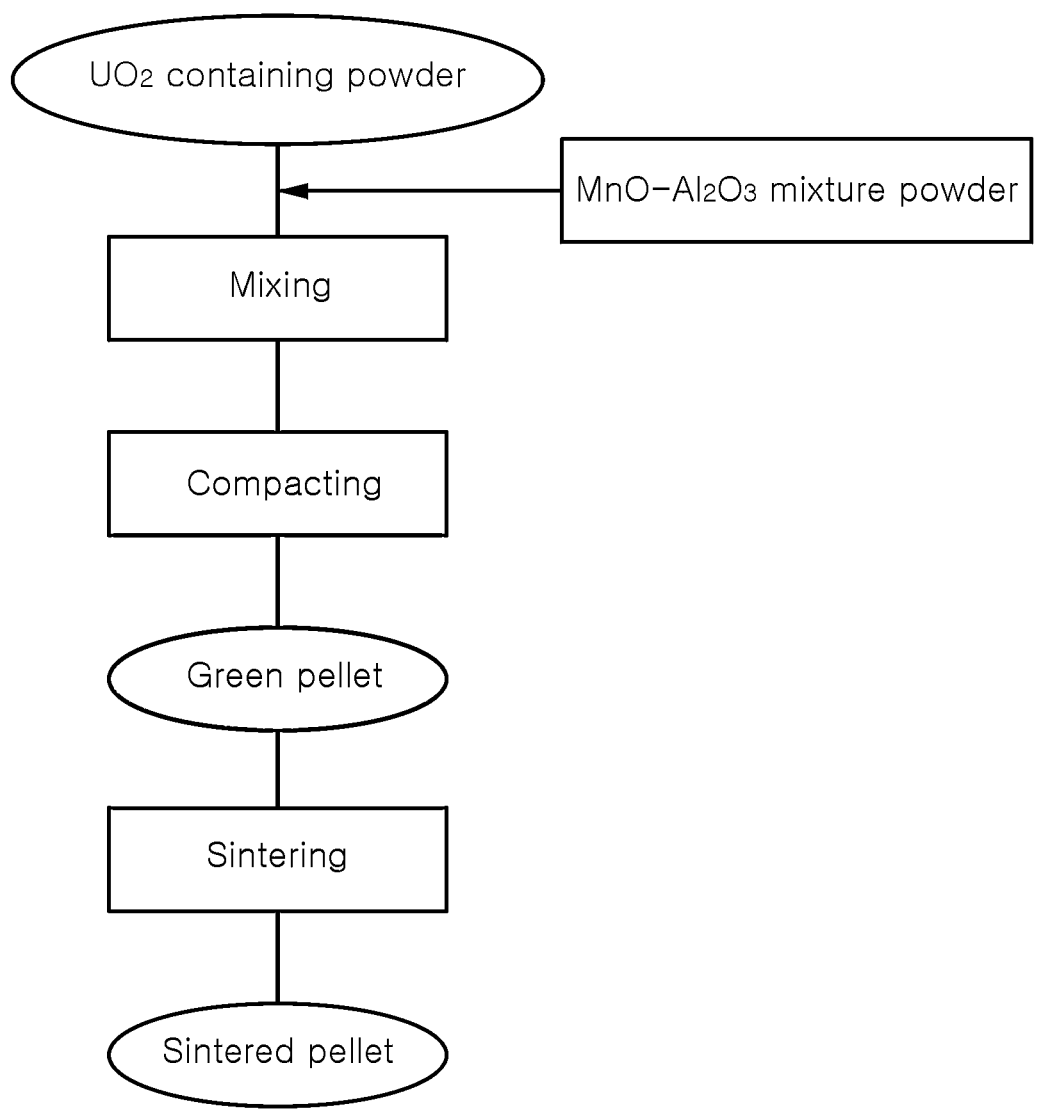
FIG. 1 is a schematic flow chart illustrating the process of a method for fabricating nuclear fuel pellets according to an exemplary embodiment of the present invention.

FIG. 1 is a schematic flow chart illustrating the process of a method for fabricating nuclear fuel pellets according to an exemplary embodiment of the present invention. With reference to FIG. 1, a process of fabricating nuclear fuel pellets starts preparing an additive compound (i.e., additive powder) by mixing Mn and Al compounds. In particular, in the present exemplary embodiment, MnO and $Al_2O_3$ are used as the Mn and Al compounds constituting the additive. The composition of the powder compound mixed to prepare the additive may be selected by using an $MnO$—$Al_2O_3$ phase diagram (See I. H Jung et al., METALLURGICAL AND MATERIALS TRANSACTIONS B, 35B(2004) p. 259-268).

Figure 2:
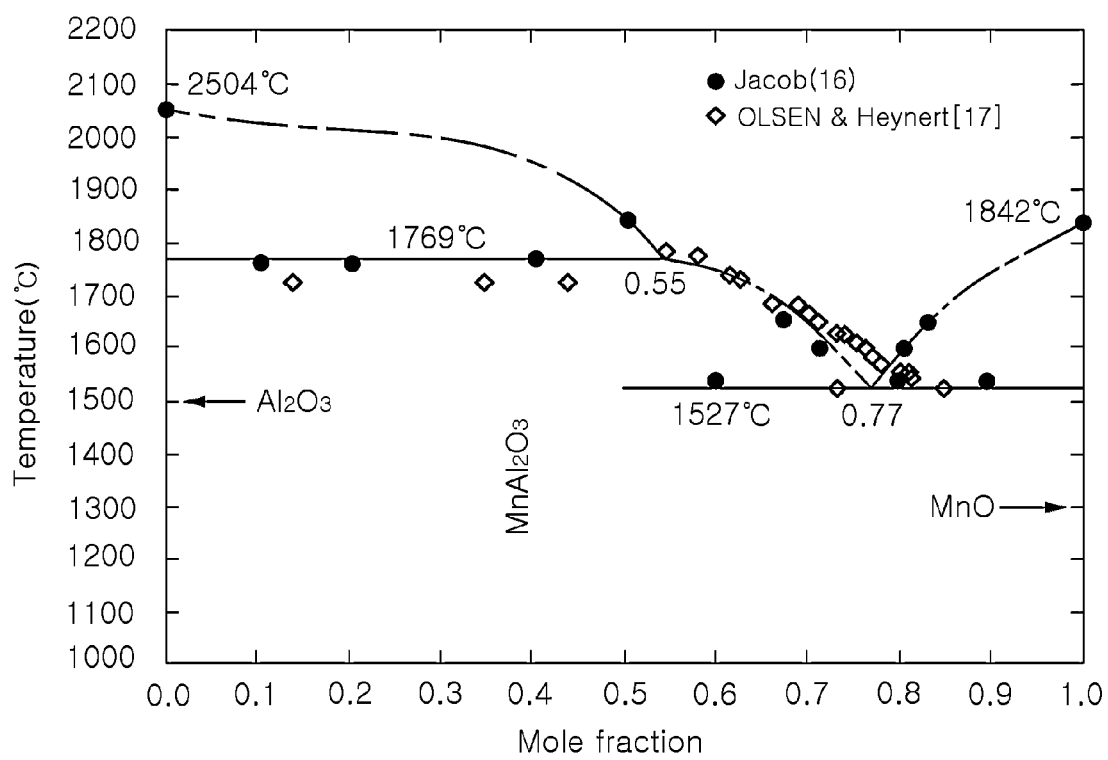
FIG. 2 is a graph showing a state of $MnO$—$Al_2O_3$.

As shown in FIG. 2, the melting temperature changes with changes in the composition of the mixture powder of Mn and Al compounds, and, in case of a mixture powder having a composition of 1 to 100 by weight of Mn/Al ratio, it melts at a temperature below 1,800° C., through a eutectic reaction. Because the highest sintering temperature generally used in fabricating $UO_2$ pellets is about 1,800° C., the additive compound is formed by mixing powder having a composition that can form a liquid eutectic phase by the eutectic reaction during sintering (i.e., an additive powder that melts at a temperature below 1,800° C.).

Next, the additive powder is mixed with a $UO_2$ raw powder to prepare a mixture powder of additive-$UO_2$ raw powder. The amount of the mixed additive may be that (cations of the additive powder)/(U cations), namely, (Mn+Al)/U, is within the range of 50 µg/g to 3,000 µg/g. This mixing process may be performed by using a tumbling mixer generally used for fabricating nuclear fuel or Nauta mixer.

In case of dry-mixing a small amount of additive to the raw powder (i.e., the $UO_2$ powder), the additive is mixed with a certain amount of medium powder, which is then added to be mixed with the raw powder to enhance mixing characteristics. In case of the $UO_2$ nuclear fuel, $UO_2$ powder or $U_3O_8$ powder may be used as the medium powder.

In the subsequent stage, the mixture powder of the additive powder and the $UO_2$ raw powder is compacted to form a green pellets. Thereafter, the green pellets are sintered at 1,600° C. to 1,800° C. under a reducing gas atmosphere (e.g., a hydrogen-containing gas atmosphere) to fabricate a nuclear fuel pellet.

For example, the obtained 'mixture powder of the additive powder and the $UO_2$ raw powder' may be injected into a mold and molded with a pressure of about 3 tons/cm$^2$ to 5 tons/cm$^2$ to produce a green pellet having a desired cylinder-like shape. Subsequently, the green pellet may be sintered at 1,600° C. to 1,800° C. for one to twelve hours under a reducing gas atmosphere. For the reducing gas atmosphere, hydrogen gas may be used, or gas obtained by mixing one or more of carbon dioxide, carbon monoxide, steam, nitrogen, and inert gas with hydrogen gas may be used.

According to the above-described sintered pellet fabricating method, the additives (i.e., the additives of Mn compound and Al compound) melts at around the sintering temperature to quickly increase a diffusivity through grain boundaries. The grain size of the sintered pellet is enlarged significantly due to the fast mass diffusivity during the sintering. Also, the sintered pellet fabricated by the above-described fabrication method has a significantly increased rate and amount of creep deformation in the transition operation conditions of a nuclear reactor or in a similar environment (See FIG. 5). Thus, when the nuclear fuel is burned up, a release of nuclear fission products from the pellet can be significantly restrained and expansion of the volume of the sintered pellet can be effectively restrained to thus enhance the safety margins of the nuclear fuel even with a high burnup.

In the embodiment, as described above with reference to FIG. 1, an oxide such as $MnO$—$Al_2O_3$ mixture powder is used as the additive of the Mn and Al compounds added to the $UO_2$ powder, but the present invention is not limited thereto. Namely, one or more Mn and Al compounds selected from nitride, stearate, chloride, and hydroxide may be alternatively used as the components of the additive.

The present invention will now be described in more detail through an embodiment example and a comparative example. The embodiment described hereinafter is merely illustrative and the present invention is not limited thereto.

(Embodiment)

A composition of 90 mol % of MnO and 10 mol % of $Al_2O_3$ was selected to prepare a mixture powder of MnO and $Al_2O_3$. After the MnO powder and $Al_2O_3$ powder were mixed according to the composition ratio, alcohol and zirconia balls are added together to the mixture, on which wet crushing and mixing was performed for 24 hours. The crushed and mixed powder was dried. The MnO—$Al_2O_3$ additive, which had been mixed, crushed, and dried with such a composition was added to $UO_2$ powder such that the weight ratio of (Mn+Al)/U was 1000 μg/g. The $UO_2$ powder and the additive were mixed in a tumbling mixer for two hours and then compressively compacted at a pressure of 3 tons/cm² to produce a green pellet. The green pellet was sintered to fabricate a sintered pellet. The sintering was performed at 1,730° C. for four hours in the $H_2$ gas atmosphere.

Figure 3:
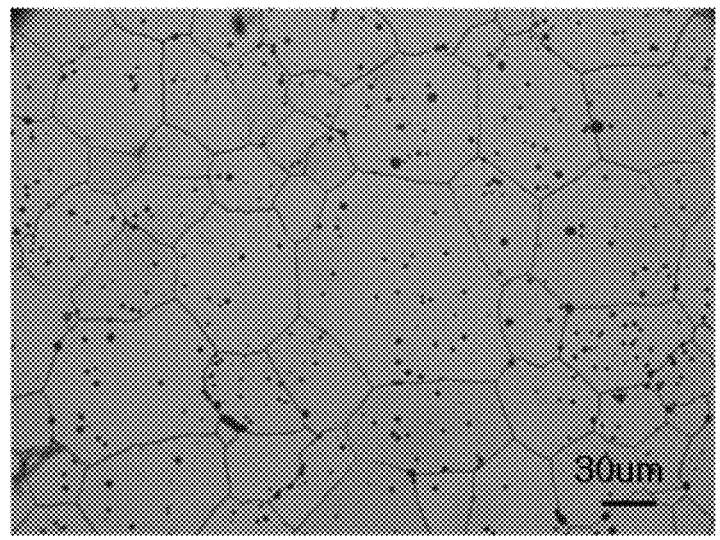
FIG. 3 is an optical microscope photograph showing the grain structure of the nuclear fuel pellet containing the $MnO$—$Al_2O_3$ additive fabricated according to an exemplary embodiment of the present invention.

The density of the pellet fabricated thusly was measured by using the Archimedes method, the surface of a longitudinally sectioned pellet was polished to observe the pore structure, and the pellet was thermally etched to observe the grain structure. The grain size of the pellet was measured through a linear intercept method. FIG. 3 is an optical microscope photograph showing the grain structure of the nuclear fuel pellet fabricated through the process of the exemplary embodiment of the present invention. The grain size of the pellet was 40 μm, which is larger by five times than 8 μm, the size of the pellet of the comparative example to be described hereinafter (See FIGS. 3 and 4).

(Comparative Example)

Figure 4:
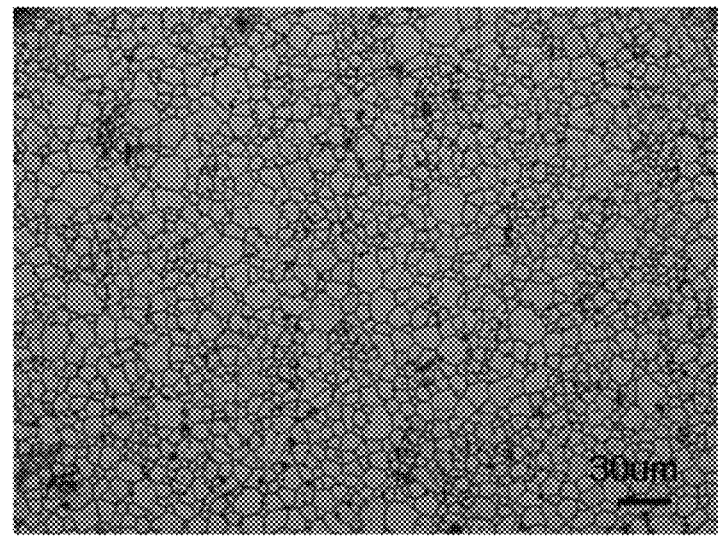
FIG. 4 is an optical microscope photograph showing the grain structure of a pure $UO_2$ pellet fabricated according to a comparative example.

For a comparison with the pellet according to the exemplary embodiment of the present invention, a pellet of pure $UO_2$, not containing an additive, was fabricated through the same fabrication process as in the exemplary embodiment of the present invention. FIG. 4 is an optical microscope photograph showing a grain structure of the pure $UO_2$. The grain size of the pure $UO_2$ pellet without an additive was measured as about 8 μm.

(Creep Experimentation)

Figure 5:
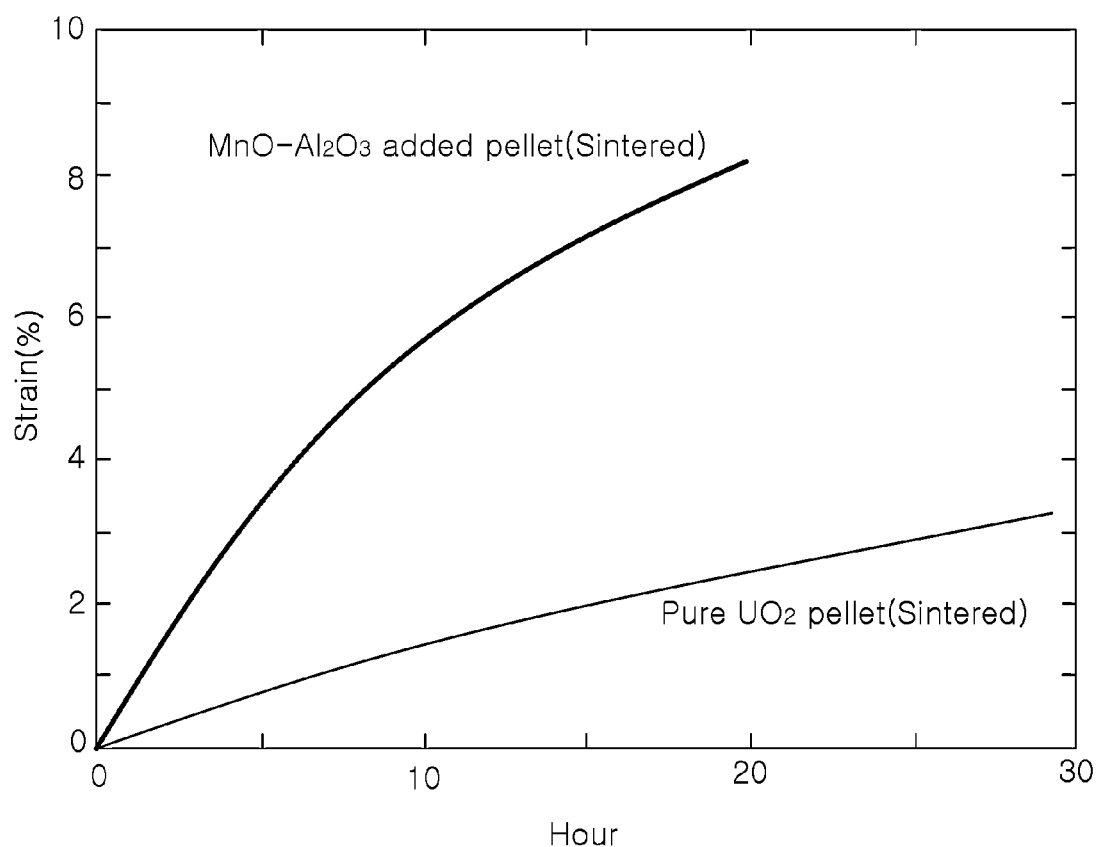
FIG. 5 is a graph of creep experimentation results comparatively showing the nuclear fuel pellet containing the $MnO$—$Al_2O_3$ additive according to an exemplary embodiment of the present invention and the pure $UO_2$ pellet according to the comparative example.

The pellets respectively fabricated through the processes of the exemplary embodiment of the present invention and the comparative example were loaded in a compression creep testing device, in which temperatures were raised up to 1,450° C., and then, initial compression stress was applied thereto at 60 MPa. The amount of compression creep deformation of the pellets over time was measured under the constant load. FIG. 5 is a time-strain (deformation amount) graph comparatively demonstrating the results of creep experimentation with respect to the pellets of the exemplary embodiment of the present invention and the comparative example. As shown in FIG. 5, it can be noted that the MnO—$Al_2O_3$ added $UO_2$ pellet fabricated according to the exemplary embodiment of the present invention is deformed more quickly by about 2.5 times than the pure $UO_2$ pellet fabricated according to the comparative example. When a creep deformation of a pellet is fast enough so that a pellet deforms faster than a cladding tube before it applies stress to the cladding tube in the case of thermal expansion, the possibility of cladding tube failure can be reduced. Thus, a pellet according to the exemplary embodiment fabricated through the present invention can obviously effectively reduce the stress working on the cladding tube. By contrast, the related art pure $UO_2$ pellet has a slow creep deformation speed, having a high possibility that it will damage the cladding tube.

As set forth above, according to exemplary embodiments of the invention, the nuclear fuel pellet containing Mn and Al as additives can retain gaseous fission products in a pellet thereby reduce stress working on the cladding tube by the fission gas because its grain size is large, and effectively reduce the pressure applied to the cladding tube resulting from the expansion of the pellet (sintered body) because the pellet is soft. As a result, the safety of nuclear fuel rod can be enhanced, damage to the cladding tube can be prevented, and the nuclear reactor can be stably operated. In particular, because failure of nuclear fuel rods in the high bunup range is reduced, the overall safety margins of the nuclear reactor, including nuclear fuel, can be enhanced.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for fabricating nuclear fuel pellets, the method comprising:
    preparing mixture powder by mixing additive powder comprising MnO and $Al_2O_3$ with $UO_2$ powder;
    compacting the mixture powder to produce green pellets; and
    sintering the green pellets at a temperature of 1,600° C. to 1,800° C. under a reducing gas atmosphere,
    wherein when the mixture powder of the additive powder and the $UO_2$ powder is prepared, the additive powder is mixed with $UO_2$ powder in such a way that the (MnO + $Al_2O_3$)/$UO_2$ ratio in the mixture powder is 57.17 μg/g to 4205.70 μg/g, and the MnO/$Al_2O_3$ ratio of the additive powder is 0.68 to 68.26 by weight, and wherein the melting point of the additive powder is below 1,800° C.

2. The method of claim 1, wherein, in sintering the green pellets, the reducing gas atmosphere is a hydrogen-containing gas atmosphere.

3. The method of claim 2, wherein the hydrogen-containing gas is hydrogen-containing mixture gas, which contains hydrogen gas and at least one selected from the group consisting of carbon dioxide, water vapor and inert gas.

4. The method of claim 2, wherein the hydrogen-containing gas is hydrogen gas.

* * * * *

UNITED STATES PATENT AND TRADEMARK OFFICE
CERTIFICATE OF CORRECTION

PATENT NO. : 8,989,340 B2  
APPLICATION NO. : 12/544497  
DATED : March 24, 2015  
INVENTOR(S) : Ki Won Kang et al.

Page 1 of 1

It is certified that error appears in the above-identified patent and that said Letters Patent is hereby corrected as shown below:

On the title page

Column 1, Item (73) Assignees, delete "Reseach" and insert -- Research --

Column 2, Item (56) OTHER PUBLICATIONS, delete "Stoicheiometry" and insert -- Stoichiometry --

Signed and Sealed this  
Twenty-eighth Day of July, 2015

Michelle K. Lee  
*Director of the United States Patent and Trademark Office*